(12) United States Patent
Nakahata

(10) Patent No.: US 7,420,647 B2
(45) Date of Patent: Sep. 2, 2008

(54) METHOD FOR PRODUCING LIQUID CRYSTAL DISPLAY DEVICE HAVING A CONTROLLED PARAMETER TO OBTAIN PRESCRIBED OPTICAL CHARACTERISTICS

(75) Inventor: Yuji Nakahata, Kumamoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/812,402

(22) Filed: Mar. 29, 2004

(65) Prior Publication Data

US 2004/0223112 A1 Nov. 11, 2004

(30) Foreign Application Priority Data

Mar. 31, 2003 (JP) ............................. 2003-093615
Mar. 31, 2003 (JP) ............................. 2003-095350

(51) Int. Cl.
*C09K 19/02* (2006.01)
*G02F 1/1337* (2006.01)

(52) U.S. Cl. .................. 349/183; 349/155; 349/163; 349/187; 349/191

(58) Field of Classification Search .................. 349/86, 349/88, 89, 123, 183, 187, 163
See application file for complete search history.

(56) References Cited

U.S. PATENT DOCUMENTS

| | | | | |
|---|---|---|---|---|
| 5,528,401 | A | 6/1996 | Narutaki et al. ............. 349/124 |
| 5,643,471 | A * | 7/1997 | Onishi et al. .................. 216/23 |
| 5,673,092 | A | 9/1997 | Horie et al. | |
| 5,680,184 | A | 10/1997 | Nishino ........................ 349/78 |
| 6,128,056 | A * | 10/2000 | Kubota et al. ................. 349/86 |
| 6,330,048 | B1 * | 12/2001 | Shiomi et al. ................ 349/155 |
| 6,551,667 | B2 * | 4/2003 | Kubota et al. ................ 428/1.1 |
| 6,781,665 | B2 * | 8/2004 | Nakanishi et al. ........... 349/183 |
| 6,841,427 | B2 * | 1/2005 | Freeman ..................... 438/149 |
| 2002/0021401 | A1 | 2/2002 | Kataoka ..................... 349/178 |
| 2002/0047983 | A1 * | 4/2002 | Chen et al. .................. 349/187 |
| 2002/0097362 | A1 | 7/2002 | Yamada et al. | |
| 2003/0043336 | A1 * | 3/2003 | Sasaki et al. ................ 349/187 |

(Continued)

FOREIGN PATENT DOCUMENTS

JP 5-158020 6/1993

(Continued)

*Primary Examiner*—Andrew Schechter
*Assistant Examiner*—Nathanael R Briggs
(74) *Attorney, Agent, or Firm*—Greer, Burns & Crain, Ltd.

(57) ABSTRACT

The present invention relates to a method for producing a liquid crystal display device, in which a pretilt angle and a tilt direction upon application of a voltage of liquid crystal molecules are controlled by using a polymer and is to provide a method for producing a liquid crystal display device that provides good display characteristics. The method for producing a liquid crystal display device includes steps of: sealing a liquid crystal containing a polymerizable component capable of being polymerized with heat or light between a pair of substrates having been disposed as being opposed to each other; and polymerizing the polymerizable component by irradiating the liquid crystal with light of a prescribed luminance at a prescribed temperature for a prescribed irradiating time under application of a prescribed voltage, so as to control a pretilt angle and a tilt direction of liquid crystal molecules, and at least one of the voltage, the temperature, the luminance and the irradiation time is set as a parameter to obtain prescribed optical characteristics.

7 Claims, 12 Drawing Sheets

U.S. PATENT DOCUMENTS

| | | | | |
|---|---|---|---|---|
| 2003/0048401 | A1 | 3/2003 | Hanoaka et al. | 349/123 |
| 2003/0090617 | A1* | 5/2003 | Kawamoto et al. | 349/187 |
| 2003/0156247 | A1* | 8/2003 | Kishida et al. | 349/187 |
| 2004/0174471 | A1* | 9/2004 | Nakanishi et al. | 349/93 |

FOREIGN PATENT DOCUMENTS

| | | |
|---|---|---|
| JP | 7-5444 | 1/1995 |
| JP | 7-043689 | 2/1995 |
| JP | 8-015696 | 1/1996 |
| JP | A 10-186330 | 7/1998 |
| JP | 11-119199 | 4/1999 |
| JP | 2001-033767 | 2/2001 |
| JP | 2002-023199 | 1/2002 |
| JP | 2002-357830 | 12/2002 |
| KR | 10-0222272 | 10/1999 |
| KR | 2003-0019080 | 3/2003 |

* cited by examiner

METHOD FOR PRODUCING LIQUID CRYSTAL DISPLAY DEVICE HAVING A CONTROLLED PARAMETER TO OBTAIN PRESCRIBED OPTICAL CHARACTERISTICS

BACKGROUND OF THE INVENTION

1. Field of the Invention

The present invention relates to a method for producing a liquid crystal display device, in which a pretilt angle and a tilt direction upon application of a voltage of liquid crystal molecules are controlled by using a polymer.

2. Description of the Related Art

In a liquid crystal display device of a multi-domain vertical alignment mode (MVA-LCD), a liquid crystal having negative dielectric anisotropy is vertically aligned, and the alignment direction of the liquid crystal upon application of a voltage is controlled to certain directions in pixels by utilizing an alignment controlling structure, such as linear protrusions and slits provided on a substrate, without rubbing.

An MVA-LCD has such an advantage that it has excellent viewing angle characteristics in comparison to a liquid crystal display device of a TN mode, but it disadvantageously exhibits a low white luminance and low luminosity. The disadvantages are caused by such a mechanism that the area occupied by the alignment controlling structure forms segmentation boundaries in alignment of the liquid crystal, and the area is viewed with low luminosity to lower the light transmittance of the entire pixels. In order to remove the disadvantages, the interval of the alignment controlling structure is sufficiently broadened. In this case, however, a prolonged period of time is required for stabilizing the alignment of the liquid crystal due to the small amount of the alignment controlling structure for controlling the alignment, whereby the response time is prolonged.

In order to obtain an MVA-LCD having a high luminance and a short response time, it has been proposed that an alignment direction of a liquid crystal upon driving is controlled by using a polymer. In this method, a liquid crystal material obtained by mixing a liquid crystal and a monomer (polymerizable component) capable of being polymerized with heat or light is sealed between two substrates. The monomer is polymerized by irradiating the liquid crystal layer with UV light in a state where the liquid crystal molecules are tilted by applying a prescribed voltage between the substrates, so as to form a polymer. A liquid crystal layer controlled to a prescribed alignment direction and a prescribed pretilt angle is thus obtained even after removing the applied voltage, owing to the polymer formed in the vicinity of the surfaces of the substrates. Accordingly, a rubbing treatment of an alignment film can be omitted.

The aforementioned related art can be found, for example, in JP-A-7-5444, JP-A-2001-33767 and JP-A-5-158020.

However, it has been found in the liquid crystal display device produced by using the method of controlling the alignment direction of the liquid crystal molecules upon driving with a polymer that fluctuation in thickness of the cells largely influences the optical characteristics. Specifically, the cell thickness influences the optical characteristics in both cases upon polymerizing the polymer and upon practically driving the device, and therefore, such problems arise in that fluctuation in optical characteristics is increased in comparison to a device produced without polymerization, and luminance unevenness is liable to occur due to the luminance distribution of the UV light or the temperature distribution upon polymerizing the monomer.

The conventional liquid crystal display devices also have the following problems.

(1) The optical characteristics; such as the γ characteristics and the black luminance, are fluctuated upon changing the materials for the color filter layer and the alignment film, whereby the driving circuit is necessarily modified.

(2) A distribution in luminance occurs within the panel due to influences of wiring resistance, which is recognized as unevenness in luminance.

(3) The transmittance with respect to the birefringence of the liquid crystal is different by the colors of the color filter, so as to cause coloration in halftone.

A liquid crystal display device is demanded to have bright display without unevenness, high speed response, less color change in half tone, and constant optical characteristics, such as the γ characteristics and the black luminance, from the standpoint of mass production.

SUMMARY OF THE INVENTION

An object of the invention is to provide a method for producing a liquid crystal display device that provides good display characteristics.

The aforementioned and other objects of the invention can be attained by a method for producing a liquid crystal display device containing steps of: sealing a liquid crystal containing a polymerizable component capable of being polymerized with heat or light between a pair of substrates having been disposed as being opposed to each other; and polymerizing the polymerizable component by irradiating the liquid crystal with light of a prescribed luminance at a prescribed temperature for a prescribed irradiating time under application of a prescribed voltage, so as to control a pretilt angle and a tilt direction of liquid crystal molecules, setting at least one of the voltage, the temperature, the luminance and the irradiation time as a parameter to obtain prescribed optical characteristics.

DESCRIPTION OF THE PREFERRED EMBODIMENTS

First Embodiment

Figure 1:
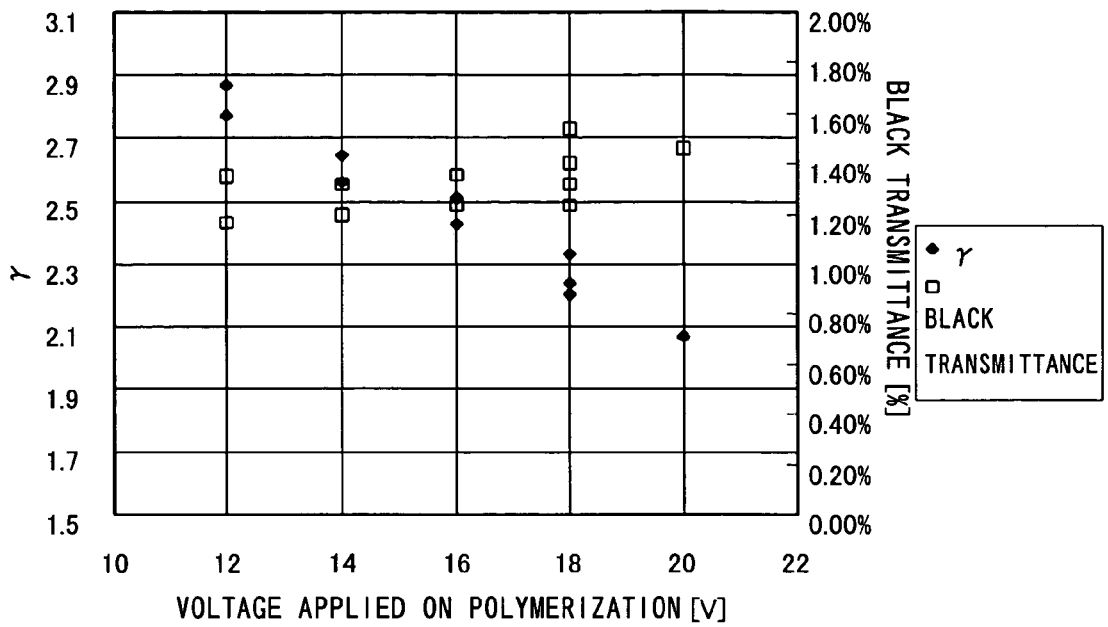
FIG. 1 is a graph showing variation of optical characteristics depending on a voltage applied on polymerization, which is a prerequisite of method for producing a liquid crystal display device of Example 1-1 according to a first embodiment of the invention.

The method for producing a liquid crystal display device according to a first embodiment of the invention will be described with reference to FIGS. 1 to 7. In this embodiment, at least one of a voltage, a temperature and a luminance and a radiation time of UV light thus radiated is appropriately controlled as a parameter upon polymerizing a monomer to form a polymer, whereby the desired optical characteristics, such as the γ characteristics and the black luminance (black transmittance), are obtained. The voltage may be controlled, for example, within a range of 0.1 V to 100 V. The temperature may be controlled, for example, within a range of −30° C. to 250° C. The luminance may be controlled, for example, within a range of 1 mW/cm$^2$ to 10,000 mW/cm$^2$. The radiation time maybe controlled, for example, within a range of 1 msec to 24 hours.

In this embodiment, at least one of a concentration of a polymerizable component, a concentration of a polymerization initiator and a concentration of a polymerization inhibitor is appropriately controlled as a parameter, whereby the desired optical characteristics are obtained. The concentration of the polymerizable component may be controlled, for example, within a range of 0.001% to 10% by weight. The concentration of the polymerization initiator may be controlled, for example, within a range of 0.0001% to 10% by weight.

In this embodiment, a thickness of a cell or a height of a pillar spacer is measured before and after injecting a liquid crystal, and the parameters are controlled under feedback of the measured value. According to the procedures, a pretilt angle, i.e., T-V characteristics, of liquid crystal molecules can be controlled, whereby the optical characteristics, such as the γ characteristics and the black luminance, can be maintained constant in each liquid crystal display device.

In this embodiment, an applied voltage is varied in each color (each pixel) of a color filter layer, or a radiation amount of UV light radiated on a liquid crystal is changed by appropriately controlling an UV light transmittance of a color filter layer, upon polymerizing a monomer. According to the procedures, the T-V characteristics can be appropriately controlled to suppress coloration in halftone.

In this embodiment, a luminance distribution within a panel is previously measured, and an applied voltage (or in alternative, an UV light radiation amount or a temperature) upon polymerizing a monomer is varied in each region of the panel. For example, the applied voltage is increased in a region where the luminance is low. According to the procedures, the luminance distribution can be compensated to obtain a liquid crystal display device having less unevenness in luminance.

In this embodiment, upon polymerizing a monomer, the panel surface was irradiated by scanning thereon with UV light by using a linear light source. UV light is radiated by scanning in a direction within a panel. According to the procedures, UV light can be uniformly radiated within the panel to produce a liquid crystal display device having less unevenness in luminance. Further, the aforementioned compensation can be easily carried out in the scanning direction.

According to the embodiment, the optical characteristics, such as the γ characteristics and the black luminance, can be made constant in each panel, and the optical characteristics can be arbitrarily controlled in a state of the panel. Therefore, such a liquid crystal display device with high display quality can be obtained that exhibits no coloration in halftone and less luminance distribution within the panel.

The embodiment will be described in more detail with reference to the following specific examples.

EXAMPLE 1-1

TFT elements, a drain bus line, a gate bus line, a pixel electrode and other necessary components were formed on one substrate. A color filter layer, a common electrode and other necessary components were formed on another substrate. Both the substrates were attached with spacers each having a diameter of 4 μm intervening therebetween to produce a blank cell. A liquid crystal composition containing a photopolymerizable or thermally polymerizable component was injected in the blank cell to produce a liquid crystal panel. The liquid crystal composition was a negative liquid crystal (produced by Merck Japan Co., Ltd.) mixed with 0.3% by weight of an acrylic polymerizable component exhibiting nematic liquid crystallinity (produced by Merck Japan Co., Ltd.). Plural liquid crystal panels thus produced were subjected to polymerization of the polymerizable component under the following conditions, and the following results were obtained.

(1) While an alternating current voltage of 12 to 20 V was applied between the common electrode and the storage capacitor bus line of the liquid crystal panel, the panel was irradiated with UV light to polymerize the polymerizable component. FIG. 1 is a graph showing variation of the optical characteristics depending on the voltage applied on polymerization. The abscissa indicates the voltage (V) applied on polymerization, and the ordinate indicates the $\gamma$ value and the black transmittance (%). In the graph, solid diamonds indicate the $\gamma$ value, and hollow squares indicate the black transmittance. As shown in FIG. 1, the $\gamma$ value and the black transmittance of the liquid crystal display device vary depending on the voltage applied on polymerization. Therefore, it is understood that a liquid crystal display device having the desired optical characteristics, such as the $\gamma$ value and the black transmittance, can be obtained by appropriately controlling the voltage applied on polymerization.

Figure 2:
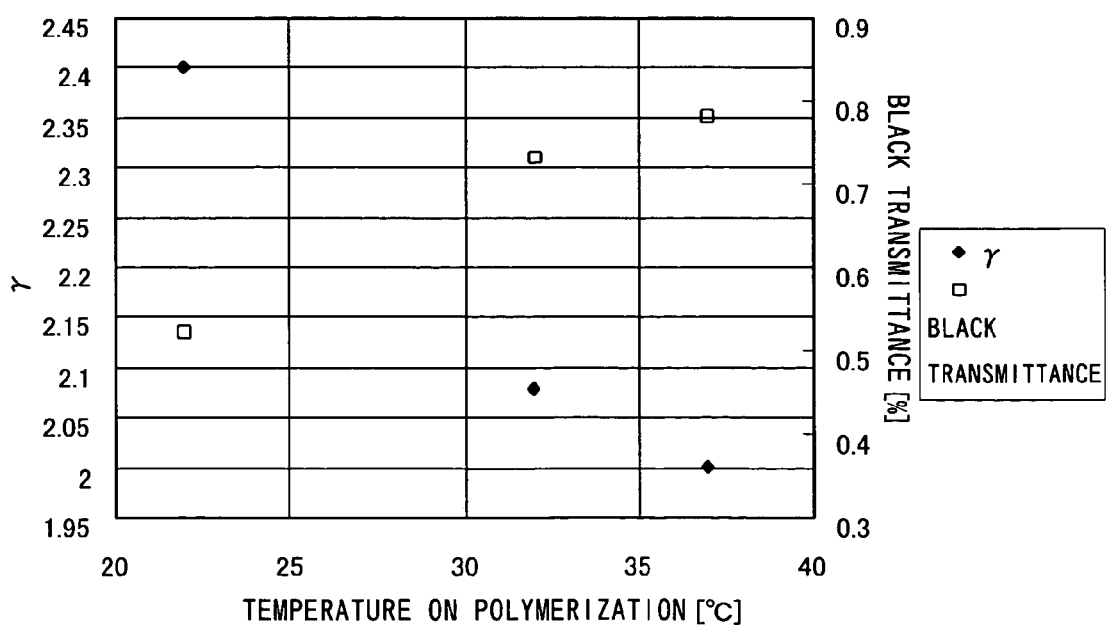
FIG. 2 is a graph showing variation of optical characteristics depending on a temperature on polymerization, which is a prerequisite of a method for producing a liquid crystal display device of Example 1-1 according to the first embodiment of the invention.

(2) While an alternating current voltage of 17 V was applied between the common electrode and the storage capacitor bus line of the liquid crystal panel, and the temperature was controlled, the panel was irradiated with UV light to polymerize the polymerizable component. FIG. 2 is a graph showing variation of the optical characteristics depending on the temperature on polymerization. The abscissa indicates the temperature (° C.) on polymerization, and the ordinate indicates the $\gamma$ value and the black transmittance (%). In the graph, solid diamonds indicate the $\gamma$ value, and hollow squares indicate the black transmittance. As shown in FIG. 2, the $\gamma$ value and the black transmittance of the liquid crystal display device vary depending on the temperature on polymerization. Therefore, it is understood that a liquid crystal display device having the desired optical characteristics, such as the $\gamma$ value and the black transmittance, can be obtained by appropriately controlling the temperature on polymerization.

Figure 3:
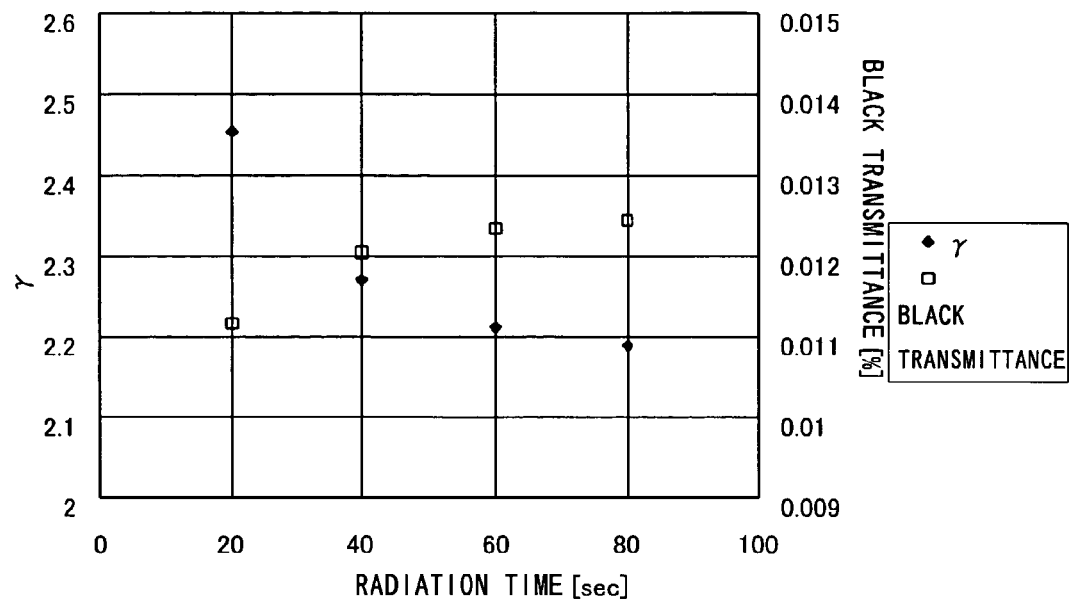
FIG. 3 is a graph showing variation of optical characteristics depending on an irradiation time of UV light, which is a prerequisite of a method for producing a liquid crystal display device of Example 1-1 according to the first embodiment of the invention.

(3) While an alternating current voltage of 18 V was applied between the common electrode and the storage capacitor bus line of the liquid crystal panel, the panel was irradiated with UV light for a prescribed period of time to polymerize the polymerizable component. FIG. 3 is a graph showing variation of the optical characteristics depending on the radiation time of UV light. The abscissa indicates the radiation time (sec), and the ordinate indicates the $\gamma$ value and the black transmittance (%). In the graph, solid diamonds indicate the $\gamma$ value, and hollow squares indicate the black transmittance. As shown in FIG. 3, the $\gamma$ value and the black transmittance of the liquid crystal display device vary depending on the radiation time of UV light. Therefore, it is understood that a liquid crystal display device having the desired optical characteristics, such as the $\gamma$ value and the black transmittance, can be obtained by appropriately controlling the radiation time of UV light.

EXAMPLE 1-2

TFT elements, a drain bus line, a gate bus line, a pixel electrode and other necessary components were formed on one substrate. A color filter layer, a common electrode and other necessary components were formed on another substrate. Both the substrates were attached with spacers each having a diameter of 4 μm intervening therebetween to produce a blank cell. Plural liquid crystal panels were produced by using the blank cell.

Figure 4:
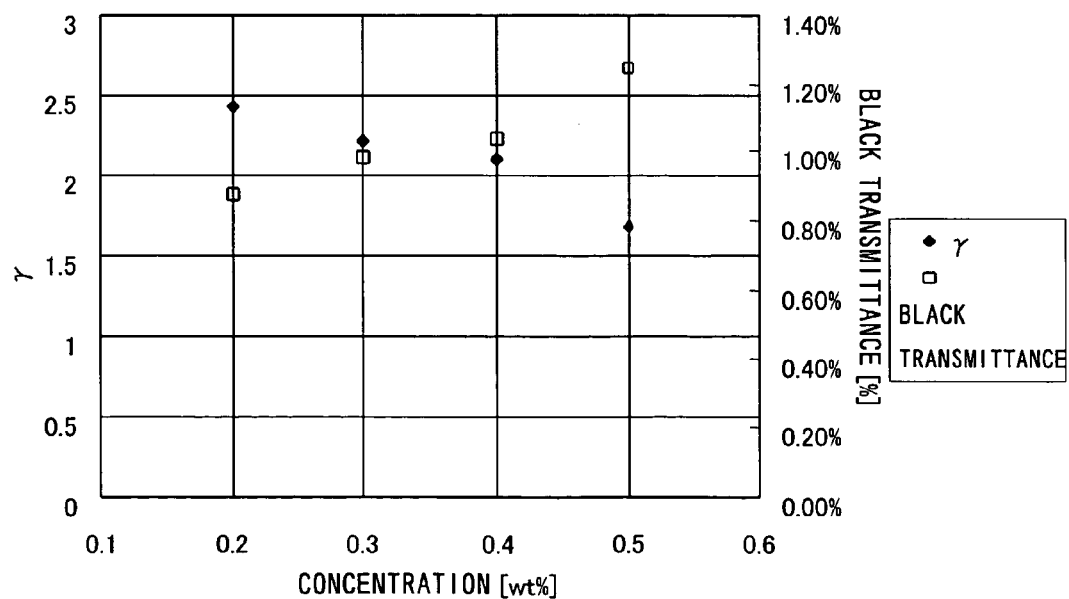
FIG. 4 is a graph showing variation of optical characteristics depending on a concentration of a polymerizable component, which is a prerequisite of a method for producing a liquid crystal display device of Example 1-2 according to the first embodiment of the invention.

(1) A liquid crystal component containing a photopolymerizable or thermally polymerizable component was injected in the blank cells to produce plural liquid crystal panels. The liquid crystal composition was a negative liquid crystal (produced by Merck Japan Co., Ltd.) mixed with 0.1 to 0.5% by weight of an acrylic polymerizable component exhibiting nematic liquid crystallinity (produced by Merck Japan Co., Ltd.) While an alternating current voltage of 18 V was applied between the common electrode and the storage capacitor bus line of the liquid crystal panel, the panel was irradiated with UV light for a prescribed period of time to polymerize the polymerizable component. FIG. 4 is a graph showing variation of the optical characteristics depending on the concentration of the polymerizable component. The abscissa indicates the concentration of the polymerizable component (% by weight), and the ordinate indicates the $\gamma$ value and the black transmittance (%). In the graph, solid diamonds indicate the $\gamma$ value, and hollow squares indicate the black transmittance. As shown in FIG. 4, the $\gamma$ value and the black transmittance of the liquid crystal display device vary depending on the concentration of the polymerizable component. Therefore, it is understood that a liquid crystal display device having the desired optical characteristics, such as the $\gamma$ value and the black transmittance, can be obtained by appropriately controlling the concentration of the polymerizable component.

(2) A liquid crystal component containing a photopolymerizable or thermally polymerizable component was injected in the blank cells to produce plural liquid crystal panels. The liquid crystal composition was a negative liquid crystal (produced by Merck Japan Co., Ltd.) mixed with from 0.3% by weight of an acrylic polymerizable component exhibiting nematic liquid crystallinity (produced by Merck Japan Co., Ltd.) and from 0.1 to 0.5% by weight based on the total polymerizable component of a polymerization initiator. While an alternating current voltage of 18 V was applied between the common electrode and the storage capacitor bus line of the liquid crystal panel, the panel was irradiated with UV light for a prescribed period of time to polymerize the polymerizable component. As a result, it is found that the $\gamma$ value and the black transmittance of the liquid crystal display device vary depending on the concentration of the polymerization initiator. Therefore, it is understood that a liquid crystal display device having the desired optical characteristics, such as the $\gamma$ value and the black transmittance, can be obtained by appropriately controlling the concentration of the polymerization initiator.

EXAMPLE 1-3

Figure 5:
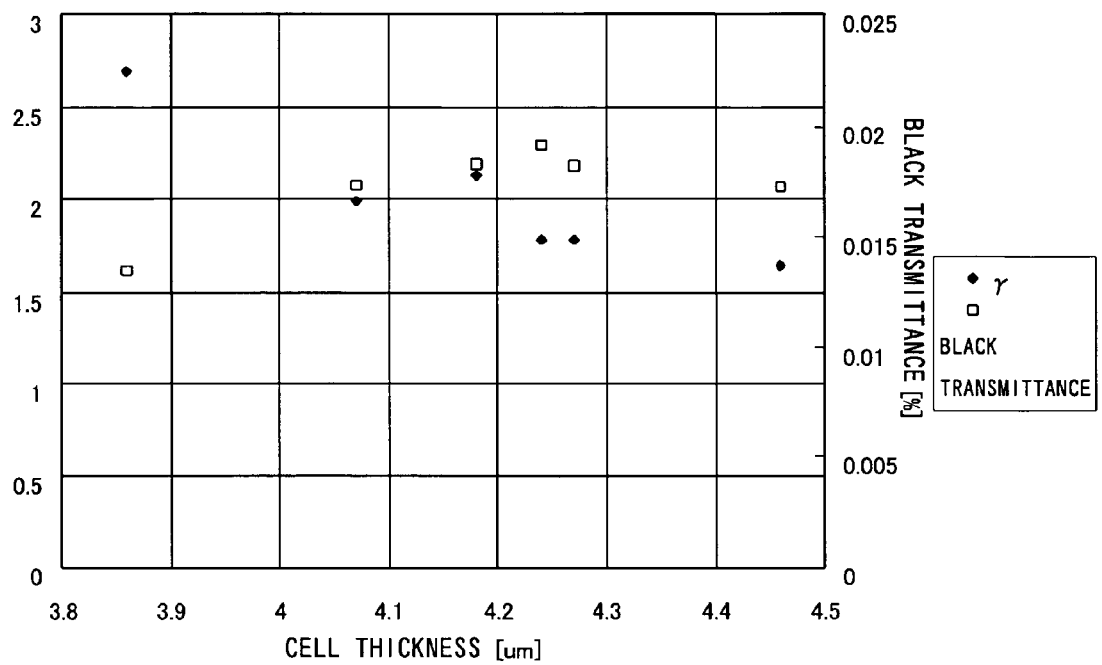
FIG. 5 is a graph showing variation of optical characteristics depending on a thickness of a cell, which is a prerequisite of a method for producing a liquid crystal display device of Example 1-3 according to the first embodiment of the invention.

TFT elements, a drain bus line, a gate bus line, a pixel electrode and other necessary components were formed on one substrate. A color filter layer, a common electrode and other necessary components were formed on another substrate. Both the substrates were attached with spacers each having a diameter of 4 μm intervening therebetween to produce a blank cell. A liquid crystal composition containing a photopolymerizable component was injected in the blank cell to produce a liquid crystal panel. The liquid crystal composition was a negative liquid crystal (produced by Merck Japan Co., Ltd.) mixed with 0.3% by weight of an acrylic polymerizable component exhibiting nematic liquid crystallinity (produced by Merck Japan Co.,Ltd.). The liquid crystal panel thus produced was measured for the thickness of the cell. While an alternating current voltage of 18 V was applied between the common electrode and the storage capacitor bus line of the liquid crystal panel, the panel was irradiated with UV light to polymerize the polymerizable component. FIG. 5 is a graph showing variation of the optical characteristics depending on the thickness of the cell. The abscissa indicates the thickness of the cell (μm), and the ordinate indicates the γ value and the black transmittance (%). In the graph, solid diamonds indicate the γ value, and hollow squares indicate the black transmittance. As shown in FIG. 5, the γ value and the black transmittance of the liquid crystal display device vary depending on the thickness of the cell. Therefore, it is understood that a liquid crystal display device having the desired optical characteristics, such as the γ value and the black transmittance, can be obtained by controlling the respective parameters under feedback of the measured thickness of the cell to the aforementioned examples.

EXAMPLE 1-4

TFT elements, a drain bus line, a gate bus line, a pixel electrode and other necessary components were formed on one substrate. A color filter layer, a common electrode and other necessary components were formed on another substrate. Both the substrates were attached with spacers each having a diameter of 4 μm intervening therebetween to produce a blank cell. A liquid crystal composition containing a photopolymerizable component was injected in the blank cell to produce a liquid crystal panel. The liquid crystal composition was a negative liquid crystal (produced by Merck Japan Co., Ltd.) mixed with 0.3% by weight of an acrylic polymerizable component exhibiting nematic liquid crystallinity (produced by Merck Japan Co., Ltd.). While the red pixels, the green pixels and the blue pixels of the liquid crystal panel thus produced were applied with voltages of 9 V, 10 V and 7 V, respectively, the panel was irradiated with UV light to polymerize the polymerizable component. The voltage applied on polymerization thus varied by each color, whereby different T-V characteristics were obtained by each color.

Figure 6:
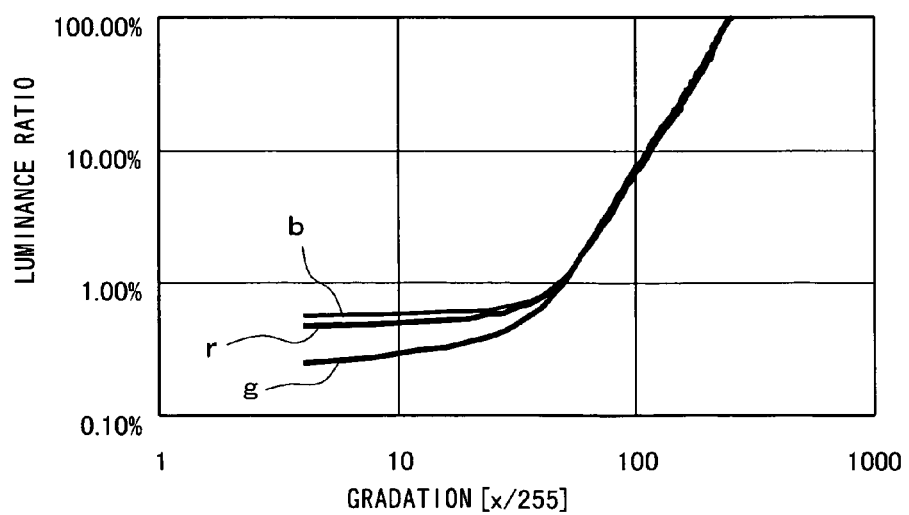
FIG. 6 is a graph showing variation of a luminance ratio depending on gradation of a liquid crystal display device produced in Example 1-4 according to the first embodiment of the invention.
Figure 7:
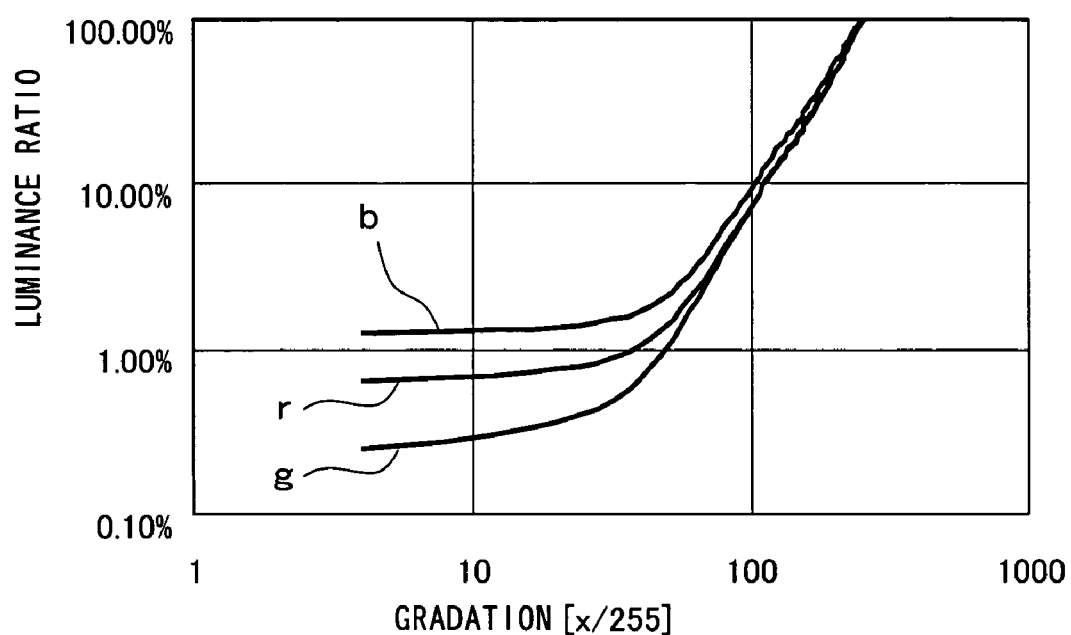
FIG. 7 is a graph showing variation of a luminance ratio depending on gradation in an ordinary liquid crystal display device.

FIG. 6 is a graph showing variation of the luminance ratio depending on gradation of the liquid crystal display device produced in this example. FIG. 7 is a graph showing variation of the luminance ratio depending on gradation in an ordinary liquid crystal display device, in which the voltage applied on polymerization is 7 V in all the pixels. In the graphs, the abscissa indicates logarithm of the gradation (x/255), and the ordinate indicates logarithm of the luminance ratio. In the graphs, the curve r indicates the red pixel, the curve g indicates the green pixel, and the curve b indicates the blue pixel. As shown in FIGS. 6 and 7, the difference in luminance ratio among the colors is relatively suppressed by compensating the T-V characteristics by each color in the invention. Accordingly, a liquid crystal display device suppressed in coloration in halftone can be obtained.

EXAMPLE 1-5

TFT elements, a drain bus line, a gate bus line, a pixel electrode and other necessary components were formed on one substrate. A color filter layer, a common electrode and other necessary components were formed on another substrate. Both the substrates were attached with spacers each having a diameter of 4 μm intervening therebetween to produce a blank cell. A liquid crystal composition containing a photopolymerizable component was injected in the blank cell to produce a liquid crystal panel. The liquid crystal composition was a negative liquid crystal (produced by Merck Japan Co., Ltd.) mixed with 0.3% by weight of an acrylic polymerizable component exhibiting nematic liquid crystallinity (produced by Merck Japan Co.,Ltd.). The liquid crystal panel thus produced was measured for a luminance distribution in advance. While a high voltage was applied to a region with a low luminance, and a low voltage was applied to a region with a high luminance (with the voltage ranging from 7 to 9 V) based on the luminance distribution, the panel was irradiated with UV light to polymerize the polymerizable component. As a result, a liquid crystal display device having less luminance distribution within the panel can be obtained.

EXAMPLE 1-6

TFT elements, a drain bus line, a gate bus line, a pixel electrode and other necessary components were formed on one substrate. A color filter layer, a common electrode and other necessary components were formed on another substrate. Both the substrates were attached with spacers each having a diameter of 4 μm intervening therebetween to produce a blank cell. A liquid crystal composition containing a photopolymerizable component was injected in the blank cell to produce a liquid crystal panel. The liquid crystal composition was a negative liquid crystal (produced by Merck Japan Co., Ltd.) mixed with 0.5% by weight of an acrylic polymerizable component exhibiting nematic liquid crystallinity (produced by Merck Japan Co., Ltd.). While an alternating current voltage of 12 V was applied to the liquid crystal panel thus produced, the panel surface was uniformly irradiated by scanning thereon with UV light by using an ultrahigh pressure mercury linear light source to polymerize the polymerizable component. As a result, a liquid crystal display device having less unevenness in luminance due to illuminance distribution can be obtained.

According to this embodiment described in the foregoing, the display characteristics can be improved in a liquid crystal display device, in which the pretilt angle and the tilt direction upon application of a voltage of the liquid crystal molecules are controlled by utilizing a polymer material obtained by polymerization under light or heat, whereby unevenness in optical characteristics in each panel can be reduced.

Second Embodiment

A second embodiment of the invention related to a method for producing a liquid crystal display device.

As an improvement of an MVA mode liquid crystal display device, a liquid crystal display device using a liquid crystal composition containing a photopolymerizable component, a thermally polymerizable component or a photothermally polymerizable component (as described, for example, in JP-A-2002-23199 and JP-A-2002-357830) has been proposed. The liquid crystal display device is produced in such a manner that a liquid crystal panel is produced by holding the liquid crystal composition between a pair of substrates, and the polymerizable composition is photopolymerized or thermally polymerized under application of a voltage (after the liquid crystal molecules are tilted to a certain extent). The polymerizable component is generally constituted by a monomer capable of being polymerized with an ultra violet ray or heat. In this production method, the polymerizable component is polymerized in such a state that the liquid crystal molecules are tilted with respect to the surface of the substrate. Although the liquid crystal molecules attempt to resume the state substantially perpendicular to the surface of the substrate after completing the polymerization, the polymerizable component thus cured maintains the polymerized state, and the liquid crystal molecules are in a state slightly pretilted with respect to the surface of the substrate by receiving an adsorption power of the polymerizable component. Therefore, the response time upon application of a voltage is shortened.

In a liquid crystal display device thus produced by the production method, however, it has been found that fluctuation in optical characteristics of the liquid crystal panel occurs in the case where the thickness of the cell slightly varies. It has also been found that the state of the polymerization is preferably monitored because the display characteristics of the liquid crystal display are influenced by the state of the polymerization. Furthermore, in the case where a failure occurs in a polymerization apparatus, it is necessarily restored as soon as possible. Moreover, such display failures that have not occurred in the conventional alignment techniques become issues. For example, in the case where a liquid crystal panel before polymerization is statically charged, or a liquid crystal panel before polymerization receives a light having a longer wavelength than that on polymerization, unevenness in polymerization occurs to cause slight fluctuation in alignment state of the liquid crystal, whereby the optical characteristics are fluctuated, or unevenness in display occurs.

In the case where a foreign matter generating a radical or a cation under UV radiation or heat is attached to the blank panel or the substrate before injecting a liquid crystal, the polymerization cannot be stably carried out to cause a problem in occurrence of display unevenness.

Therefore, such a liquid crystal display device is demanded that exhibits no display unevenness, has bright display and excellent responsiveness, exhibits less color change in halftone, and provides constant optical characteristics, such as the $\gamma$ characteristics, the black luminance and the white luminance, from the standpoint of mass production.

An object of this embodiment is to provide a method for producing a liquid crystal display device capable of providing a liquid crystal display device exhibiting no display unevenness, bright display and excellent responsiveness.

In one aspect, the method for producing a liquid crystal display device according to the embodiment contains steps of: holding a liquid crystal composition containing a photopolymerizable component, a thermally polymerizable component or a photothermally polymerizable component between a pair of substrates to produce a liquid crystal panel; measuring a value indicating optical characteristics of the liquid crystal panel; and subjecting the polymerizable component to photopolymerization or thermal polymerization under application of a voltage with at least one of the voltage, a light illuminance, a temperature, a light radiation time and a heating time being adjusted based on the value thus measured.

In another aspect, the method for producing a liquid crystal display device according to the embodiment contains steps of: holding a liquid crystal composition containing a photopolymerizable component, a thermally polymerizable component or a photothermally polymerizable component between a pair of substrates to produce a liquid crystal panel; measuring a value indicating optical characteristics of the liquid crystal panel; subjecting the polymerizable component to photopolymerization or thermal polymerization under application of a voltage; and subjecting the liquid crystal panel after polymerization to additional light irradiation or additional heat application based on the value thus measured.

In still another aspect, the method for producing a liquid crystal display device according to the embodiment contains steps of: holding a liquid crystal composition containing a photopolymerizable component, a thermally polymerizable component or a photothermally polymerizable component between a pair of substrates to produce a liquid crystal panel; subjecting the polymerizable component to photopolymerization or thermal polymerization under application of a voltage; and measuring a value indicating optical characteristics of the liquid crystal panel after polymerization to evaluate the polymerization having been completed in a desired state.

According to the aforementioned constitutions, polarizing plates are disposed above and below the liquid crystal panel before polymerization, and the transmittance, the luminance and the illuminance of the liquid crystal panel are measured. Based on the values thus measured, the voltage, the light illuminance, the temperature, the light radiation time and the heating time applied to the liquid crystal molecules are appropriately controlled. According to the procedures, the $\gamma$ value, the black luminance and the white luminance can be maintained constant. Furthermore, the transmittance is similarly measured after polymerization, whereby it can be confirmed as to whether or not the polymerization has been completed in a desired state, and in the case where a failure occurs in the polymerization apparatus, restoration can be made rapidly.

In a further aspect, the method for producing a liquid crystal display device according to the embodiment contains steps of: holding a liquid crystal composition containing a photopolymerizable component, a thermally polymerizable component or a photothermally polymerizable component between a pair of substrates to produce a liquid crystal panel; subjecting the polymerizable component to photopolymerization or thermal polymerization under application of a voltage; and measuring a value indicating optical characteristics of the liquid crystal panel during polymerization.

According to the aforementioned constitution, the electric current flowing in the liquid crystal cell, and the transmittance, the luminance and the illuminance of the panel are measured during polymerization, whereby the polymerization can be prevented from proceeding without application of a prescribed voltage due to electrical contact failure upon polymerization, and thus a desired alignment state can be securely obtained.

In a still further aspect, the method for producing a liquid crystal display device according to the embodiment contains steps of: holding a liquid crystal composition containing a photopolymerizable component, a thermally polymerizable component or a photothermally polymerizable component between a pair of substrates to produce a liquid crystal panel; removing electrostatic injecte of the liquid crystal panel; and then subjecting the polymerizable component to photopolymerization or thermal polymerization under application of a voltage.

According to the aforementioned constitution, electrostatic charge on the liquid crystal panel is removed before polymerization, whereby local fluctuations in effective voltage can be removed to suppress display unevenness after polymerization.

In a still further aspect, the method for producing a liquid crystal display device according to the embodiment contains steps of: holding a liquid crystal composition containing a photopolymerizable component, a thermally polymerizable component or a photothermally polymerizable component between a pair of substrates to produce a liquid crystal panel; irradiating the liquid crystal panel with light having a longer wavelength than that on polymerization; and then subjecting the polymerizable component to photopolymerization or thermal polymerization under application of a voltage.

According to the aforementioned constitution, the liquid crystal panel is irradiated with light having a longer wavelength than that on polymerization or with weak light with or without application of a voltage before polymerization, whereby display unevenness on a part locally irradiated with light having a longer wavelength is prevented from occurring. According to the procedure, furthermore, the polymerizable component in the liquid crystal composition is activated to shorten the radiation time required for polymerization. Moreover, the γ value, the black luminance and the white luminance of the display device can be maintained constant by irradiating with light having a longer wavelength at an arbitrary intensity for an arbitrary period of time.

In a still further aspect, the method for producing a liquid crystal display device according to the embodiment contains steps of: subjecting a substrate or a pair of substrate attached to each other to irradiation of light or application heat; holding a liquid crystal composition containing a photopolymerizable component, a thermally polymerizable component or a photothermally polymerizable component between the pair of substrates to produce a liquid crystal panel; and then subjecting the polymerizable component to photopolymerization or thermal polymerization under application of a voltage.

According to the aforementioned constitution, the substrate or the blank cell before injecting the liquid crystal composition is subjected to irradiation of light or application of heat, whereby a foreign matter generating a radical or a cation under UV radiation or heat is reacted before injecting the liquid crystal composition to prevent the foreign matter from functioning as a polymerization initiator upon polymerization. Furthermore, in the case where the process step is applied to a substrate before coating an alignment film, the wettability on the surface of the substrate is improved to relieve failure of the alignment line due to repellency.

The embodiment will be described in more detail with reference to the following examples.

Figure 8:
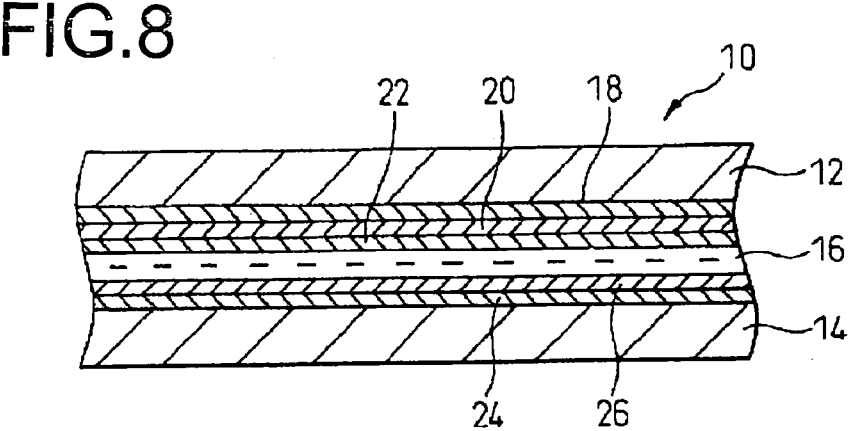
FIG. 8 is a view showing a liquid crystal display device produced in an example according to a second embodiment of the invention.

FIG. 8 is a view showing a liquid crystal display device produced in an example according to the embodiment. A liquid crystal display device (liquid crystal panel) 10 contains a liquid crystal 16 held between a pair of glass substrates 12 and 14. One glass substrate 12 is a color filter substrate, which has a color filter 18, a common electrode 20 and a vertical alignment film 22. The other glass substrate 14 is a TFT substrate, which has a TFT (not shown in the figure), a pixel electrode 24 and a vertical alignment film 26. The glass substrate 14 also has a data bus line and a gate bus line.

The liquid crystal 16 contains a liquid crystal having negative dielectric anisotropy (produced by Merck Japan Co., Ltd.) and a photopolymerizable component, a thermally polymerizable component or a photothermally polymerizable component contained in the liquid crystal. For example, the polymerizable component is formed from an acrylic polymerizable component exhibiting nematic liquid crystallinity (produced by Merck Japan Co., Ltd.), and is contained in the liquid crystal in an amount of 0.1% to 0.3% by weight. In this example, the polymerizable component is mixed in an amount of 0.2% by weight.

The pair of glass substrates 12 and 14 are attached with spacers of 4 μm intervening therebetween, and then the liquid crystal 16 is injected in a blank cell constituted from the pair of glass substrates 12 and 14. In alternative, the liquid crystal 16 is injected by dispensing on one of the glass substrates, and then the pair of glass substrates 12 and 14 are attached. The liquid crystal panel 10 is thus produced by the aforementioned procedures.

Figure 9:
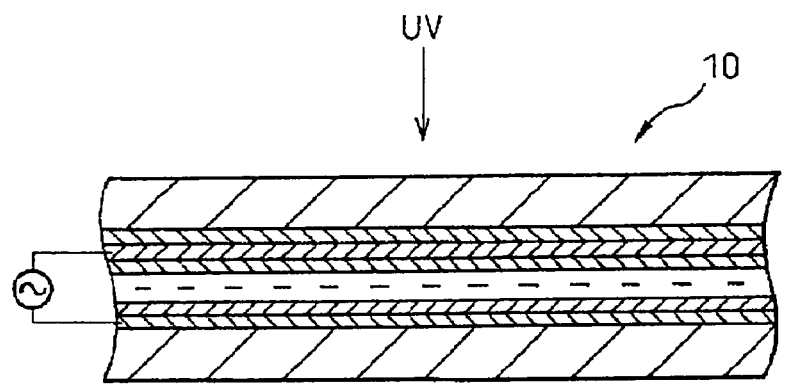
FIG. 9 is a view showing a liquid crystal display panel, which is subjected to a polymerization treatment by irradiating with an ultraviolet ray under application of a voltage to the liquid crystal panel.

FIG. 9 is a view showing the liquid crystal display panel 10, which is subjected to a polymerization treatment by irradiating with an ultraviolet (UV) ray under application of a voltage to the liquid crystal panel 10. The liquid crystal molecules are tilted to a certain extent upon application of a voltage. After the alignment direction of the liquid crystal settled to a certain extent, the panel is subjected to irradiation of light or application of heat to subject the polymerizable component to photopolymerization or thermal polymerization.

Figure 10:
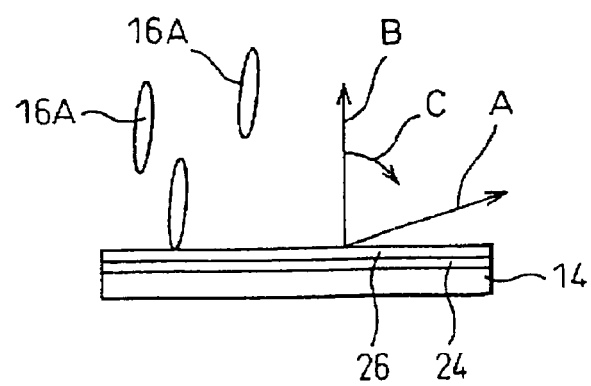
FIG. 10 is a diagram showing alignment of a liquid crystal of a liquid crystal panel having been subjected to a polymerization treatment.

FIG. 10 is a diagram showing alignment of the liquid crystal of the liquid crystal panel having been subjected to the polymerization treatment. The arrow A denotes the alignment direction of the liquid crystal molecules during polymerization, and the liquid crystal skeleton of the polymerizable components is cured by polymerization in the same alignment direction as the liquid crystal molecules. The arrow B denotes the alignment controlling direction of the vertical alignment film 26. The voltage is terminated after completion of the polymerization treatment, and therefore, the liquid crystal molecules attempt to resume the state substantially perpendicular to the surface of the substrate. However, the liquid crystal molecules 16A receive an adsorption power C from the polymerizable component thus cured. As a result, the liquid crystal molecules 16A are in a state slightly pretilted as a whole with respect to the surface of the substrate, whereby the response time of the liquid crystal upon use is shortened.

The pair of glass substrates 12 and 14 or one of the glass substrates 12 and 14 is provided with an alignment controlling structure, such as protrusions and slits. FIGS. 11A to 15 are diagrams showing examples of an alignment controlling structure, such as protrusions and slits. FIGS. 11A, 12A, 13A and 14A are cross sectional views, and FIGS. 11B, 12B, 13B, 14B and 15 are plan views.

Figure 11A:
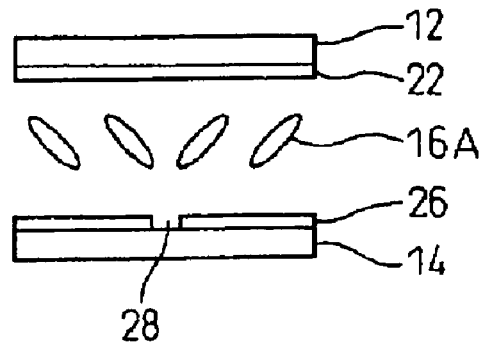
FIGS. 11A and 11B are a cross sectional view and a plane view, respectively, showing an example of an alignment controlling structure constituted by slits.
Figure 11B:
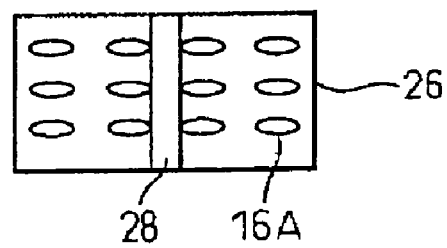

In the example shown in FIGS. 11A and 11B, a linear long slit 28 is provided on one glass substrate 14. The slit 28 is constituted, for example, from a slit provided on the pixel electrode 24, and the vertical alignment film 26 on the pixel electrode 24 is depressed at the slit of the pixel electrode 24 to form the desired shape (slit). Another linear long slit 28 may be provided on the other glass substrate 12 in parallel to the slit 28 on the substrate 12 with being staggered by half pitch. Upon application of a voltage, the liquid crystal molecules 16A are tilted to a direction perpendicular to the slit 28. In a state where the liquid crystal molecules 16A are tilted as shown in FIG. 11A, the panel is subjected to irradiation of light or application of heat to polymerize and cure the polymerizable component. The pretilted state described with reference to FIG. 10 is thus realized.

Figure 12A:
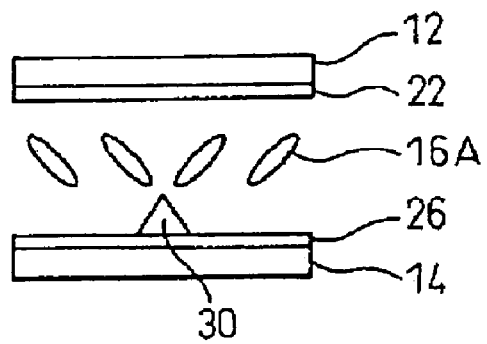
FIGS. 12A and 12B are a cross sectional view and a plane view, respectively, showing an example of an alignment controlling structure constituted by protrusions.
Figure 12B:
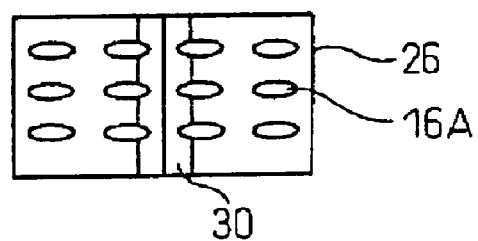

In the example shown in FIGS. 12A and 12B, a linear long protrusion 30 is provided on one glass substrates 14. The protrusion 30 is constituted, for example, by providing a dielectric material on the pixel electrode 24 to form such a configuration that the vertical alignment film 26 covers the dielectric material. Another linear long protrusion may be provided on the other glass substrate 12 in parallel to the protrusion 30 on the substrate 12 with being staggered by half pitch. Upon application of a voltage, the liquid crystal molecules 16A are tilted to a direction perpendicular to the protrusion 30. In a state where the liquid crystal molecules 16A are tilted as shown in FIG. 12A, the panel is subjected to irradiation of light or application of heat to polymerize and cure the polymerizable component. The pretilted state described with reference to FIG. 10 is thus realized.

Figure 13A:
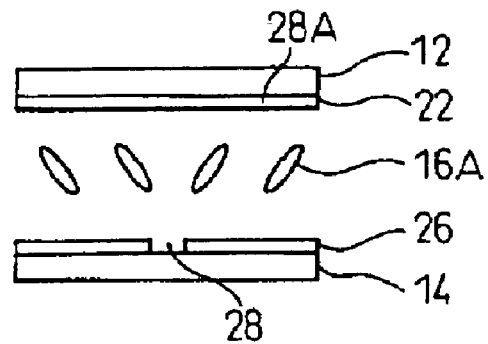
FIGS. 13A and 13B are a cross sectional view and a plane view, respectively, showing an example of an alignment controlling structure constituted by slits.
Figure 13B:
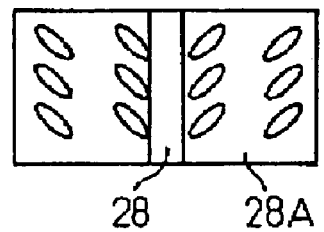

In the example shown in FIGS. 13A and 13B, a linear long slit 28 is provided on one glass substrates 14, and another linear long slit 28A is provided on the other glass substrate 12 in a direction perpendicular to the slit 28. In the case where the slits 28 and 28A perpendicular to each other are formed, upon application of a voltage, the liquid crystal molecules 16A are tilted to a direction forming 45° with respect to the slits 28 and

28A. In a state where the liquid crystal molecules 16A are tilted as shown in FIG. 13A, the panel is subjected to irradiation of light or application of heat to polymerize and cure the polymerizable component.

Figure 14A:
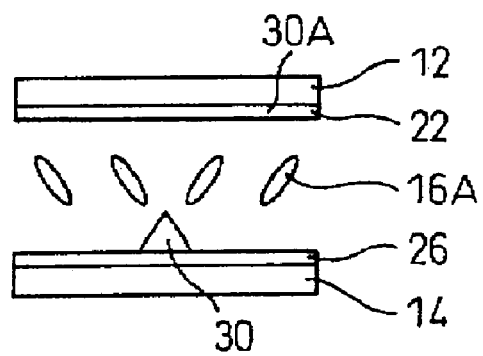
FIGS. 14A and 14B are a cross sectional view and a plane view, respectively, showing an example of an alignment controlling structure constituted by protrusions.
Figure 14B:
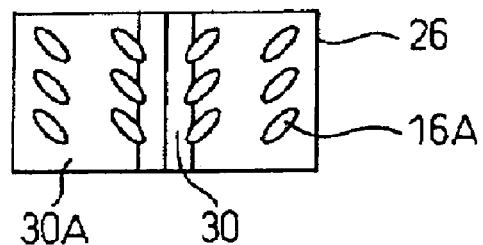

In the example shown in FIGS. 14A and 14B, a linear long protrusion 30 is provided on one glass substrates 14, and another linear long protrusion 30A perpendicular to each other is provided on the other glass substrate 12 in a direction perpendicular to the protrusion 30. In the case where the protrusions 30 and 30A are formed, upon application of a voltage, the liquid crystal molecules 16A are tilted to a direction forming 45° with respect to the protrusions 30 and 30A. In a state where the liquid crystal molecules 16A are tilted as shown in FIG. 14A, the panel is subjected to irradiation of light or application of heat to polymerize and cure the polymerizable component.

Figure 15:
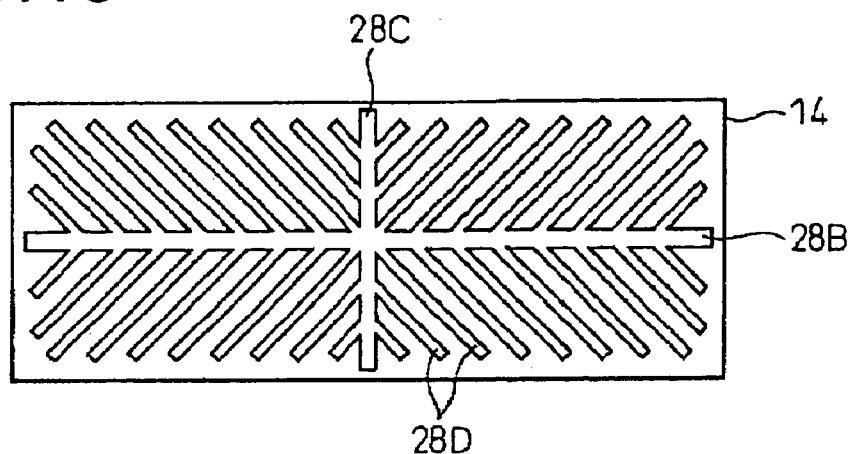
FIG. 15 is a plane view showing an example of an alignment controlling structure constituted by slits.

In the example shown in FIG. 15, a linear long slit 28B and a linear long slit 28C perpendicular to the slit 28B are provided on one glass substrate 14. In the case where the slits 28B and 28C perpendicular to each other are formed, upon application of a voltage, the liquid crystal molecules 16A are tilted to a direction forming 45° with respect to the slits 28B and 28C (as shown in FIG. 13B). In a state where the liquid crystal molecules 16A are thus tilted, the panel is subjected to irradiation of light or application of heat to polymerize and cure the polymerizable component. In FIG. 15, auxiliary thin slits 28D are formed in a direction forming 45° with respect to the slits 28B and 28C. The auxiliary thin slits 28D make the liquid crystal molecules 16A direct to a direction in parallel to the slits 28D. Protrusions perpendicular to each other may be provided instead of the slits 28B and 28C perpendicular to each other.

In this embodiment, the following means is further employed upon producing a liquid crystal display device (liquid crystal panel).

Figure 16:
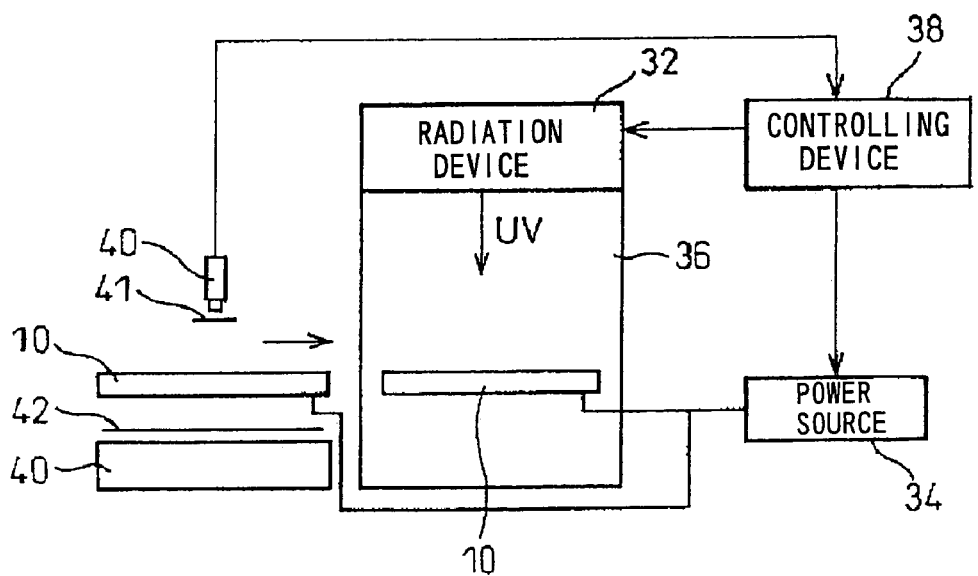
FIG. 16 is a diagram showing an example of a production apparatus for a liquid crystal display device according to the second embodiment of the invention.

FIG. 16 is a diagram showing an example of a production apparatus for a liquid crystal display device according to this embodiment. The production apparatus of a liquid crystal display device contains a radiation device 32 and a power source 34. The radiation device 32 is disposed, for example, in a chamber 36, and preferably radiates an ultraviolet ray. The chamber 36 contains a shutter capable of being opened upon radiating an ultraviolet ray. In the case where the polymerizable component is thermally polymerizable, a heating device is provided in addition to the radiation device 32 or instead of the radiation device 32.

A controlling device 38 stores the voltage, the light illuminance, the temperature, the light radiation time and the heating time required for supplying a voltage from the power source 34 to the liquid crystal panel 10, and irradiating the liquid crystal panel 10 in a state where the liquid crystal molecules are tilted with an ultraviolet ray radiated from the radiation device 32, so as to polymerize and cure the polymerizable component contained in the liquid crystal 16 as described in the foregoing, and the controlling device 38 controls the power source 34 and the radiation device 32 based on the values thus stored. In alternative, the power source 34 and the radiation device 32 may be individually controlled based on the voltage, the light illuminance, the temperature, the light radiation time and the heating time separately set.

A measuring device 40 is provided prior to a step of conveying the liquid crystal panel 10 to the chamber 36 as shown in the arrow in the figure. The measuring device 40 measures values indicating the optical characteristics of the liquid crystal panel 10. For example, the measuring device 40 contains a luminance meter and an illuminance meter for measuring the transmittance, the luminance and the illuminance of the liquid crystal panel 10 before polymerization. During the measurement, polarizers 41 and 42 are disposed as crossed nicols on the liquid crystal panel 10, and a voltage is supplied to the liquid crystal panel 10 from the power source 34.

The values thus measured by the measuring device 40 are stored in the controlling device 38, and upon conveying the liquid crystal panel 10 to the chamber 36 for subjecting to the polymerization treatment, at least one of the voltage, the light illuminance, the temperature, the light radiation time and the heating time upon polymerization is compared to the values indicating the optical characteristics of the liquid crystal panel 10 measured before polymerization, whereby the set values are adjusted to effect compensation.

For example, a voltage of 2.5 V is applied to the liquid crystal layer before polymerization, and the luminance of the liquid crystal panel 10 is measured on the polarizing plates disposed as crossed nicols. Thereafter, the polymerization is carried out in such a way that a voltage slightly lower than the prescribed value is applied to the liquid crystal panel 10 having a higher luminance, and a voltage slightly higher than the prescribed value is applied to the liquid crystal panel 10 having a lower luminance. According to the procedures, the optical characteristics in each liquid crystal panel can be made uniform obtained, and thus, the γ value and the black luminance become constant in each panel.

Figure 20:
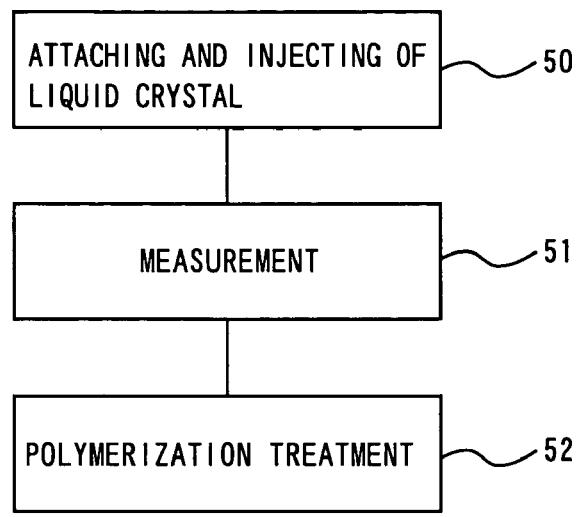
FIG. 20 is a flow chart showing an example of a polymerization treatment.

FIG. 20 is a flow chart showing an example of the polymerization treatment. In a step 50, the pair of substrates 12 and 14 are attached, and the liquid crystal 16 is injected. In a step 51, values indicating the optical characteristics of the liquid crystal panel 10 are measured. In a step 52, a voltage is applied, and light radiation (and/or heating) is effected to polymerize the polymerizable component contained in the liquid crystal 16. In this case, at least one of the voltage, the light illuminance, the temperature, the light radiating time and the heating time upon polymerization is adjusted based on the measured value indicating the optical characteristics of the liquid crystal panel 10.

Figure 21:
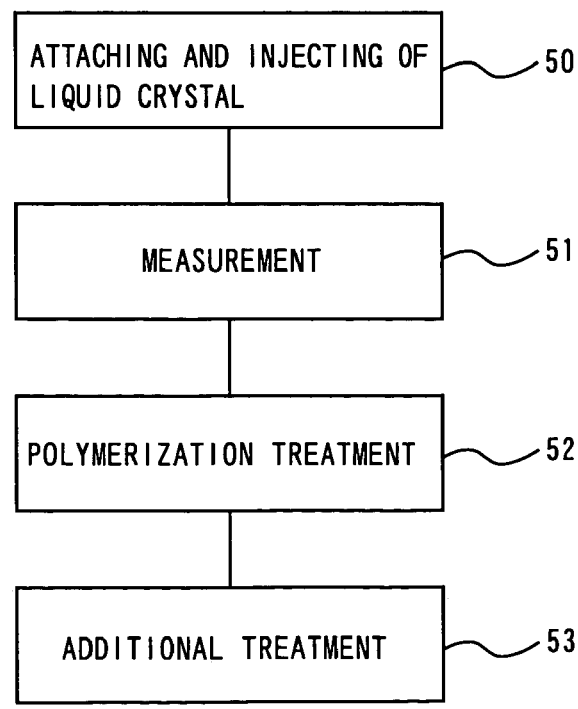
FIG. 21 is a flow chart showing another example of a polymerization treatment.

FIG. 21 is a flow chart showing another example of the polymerization treatment. In a step 50, the pair of substrates 12 and 14 are attached, and the liquid crystal 16 is injected. In a step 51, values indicating the optical characteristics of the liquid crystal panel 10 are measured. In a step 52, a voltage is applied, and light radiation is effected to polymerize the polymerizable component contained in the liquid crystal 16. In a step 53, additional light irradiation or additional heat application is effected after polymerization based on the measured value indicating the optical characteristics of the liquid crystal panel 10.

After polymerizing the polymerizable component of the liquid crystal panel 10, additional light irradiation is effected to the liquid crystal panel 10 based on the measured values indicating the optical characteristics of the liquid crystal panel 10. In this case, a slightly longer additional light irradiation time is applied to the liquid crystal panel having a higher luminance before polymerization, and a slightly shorter additional light irradiation time is applied to the liquid crystal panel having a lower luminance. According to the procedures, the γ value and the black luminance are constant in each panel.

Figure 22:
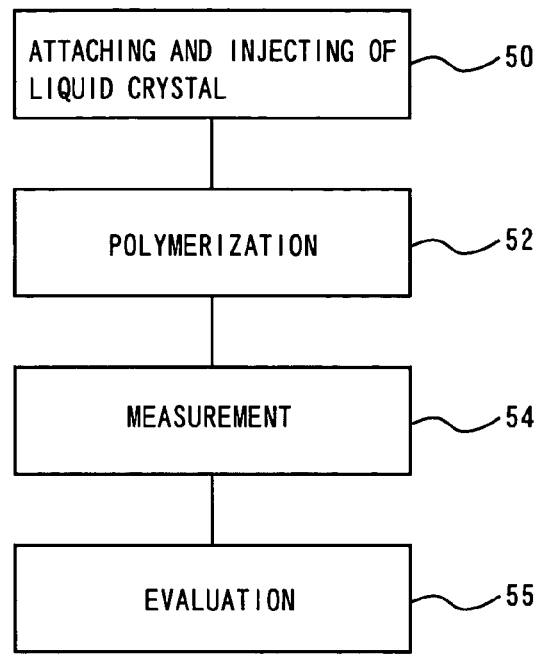
FIG. 22 is a flow chart showing still another example of a polymerization treatment.

FIG. 22 is a flow chart showing still another example of the polymerization treatment. In a step 50, the pair of substrates 12 and 14 are attached, and the liquid crystal 16 is injected. In a step 52, a voltage is applied, and light radiation is effected to polymerize the polymerizable component contained in the liquid crystal 16. In a step 54, values indicating the optical characteristics of the liquid crystal panel 10, such as the transmittance, are measured. The measurement can be carried out with the similar measuring device as the measuring device 40 in FIG. 16. In a step 55, the liquid crystal panel 10 is evaluated as to whether or not the polymerization has been completed in a desired state based on the measured value indicating the optical characteristics of the liquid crystal panel 10.

The optical characteristics of the liquid crystal panel 10, such as the transmittance, are measured after polymerization, whereby it can be confirmed as to whether or not the polymerizable component contained in the liquid crystal 16 of the liquid crystal panel 10 is polymerized in the desired state. In general, the transmittance of the liquid crystal panel 10 is substantially constant in each liquid crystal panel 10, and the γ value, the black luminance and the white luminance of the liquid crystal panels are also substantially constant. However, in the case where the transmittance of the liquid crystal panel 10 thus measured is deviated from the desired value, such an unusual matter that a failure is occurring in the polymerization apparatus is expected, whereby restoration can be made rapidly.

Figure 17:
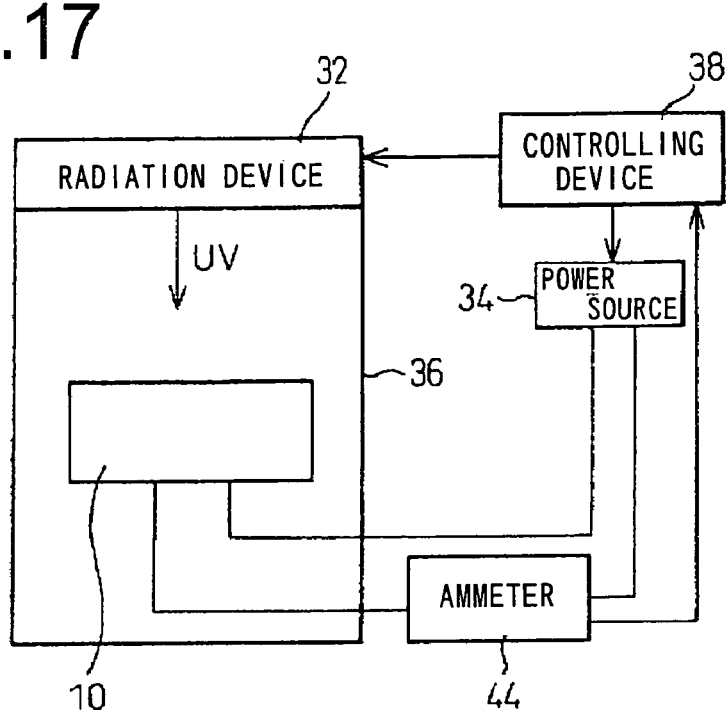
FIG. 17 is a diagram showing another example of a production apparatus for the liquid crystal display device according to the second embodiment of the invention.

FIG. 17 is a diagram showing another example of the production apparatus for a liquid crystal display device according to this embodiment. Similar to FIG. 16, the production apparatus shown in FIG. 17 contains a radiation device 32, a power source 34, a chamber 36 and a controlling device 38. Furthermore, a measuring device is provided for measuring values indicating the optical characteristics of the liquid crystal panel 10 during polymerization of the polymerizable component contained in the liquid crystal 16 of the liquid crystal panel 10. In FIG. 17, the measuring device for measuring values indicating the optical characteristics of the liquid crystal panel 10 is constituted from an ammeter 44.

The electric current flowing in the liquid crystal panel 10 and the transmittance, the luminance or the illuminance of the liquid crystal panel 10 during polymerization, whereby it can be detected as to whether or not the polymerization has even effected without application of the desired voltage to the liquid crystal due to electrical contact failure upon polymerization. According to the procedures, an unusual matter can be prevented from occurring, and thus, a liquid crystal display device having a desired pretilted alignment state can be securely obtained.

Figure 18:
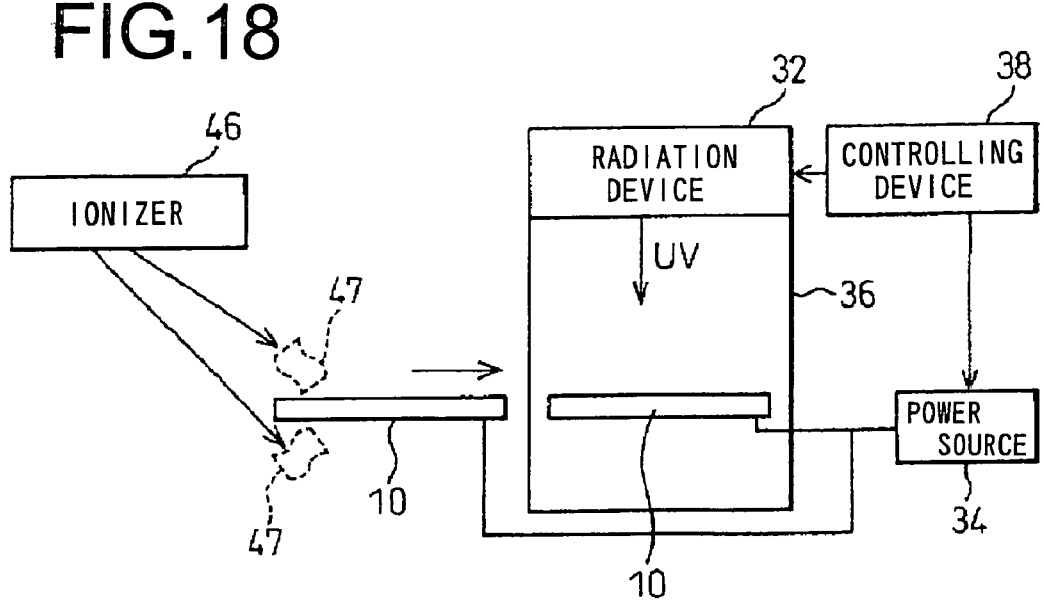
FIG. 18 is a diagram showing still another example of a production apparatus for the liquid crystal display device according to the second embodiment of the invention.

FIG. 18 is a diagram showing still another example of the production apparatus for a liquid crystal display device according to this embodiment. The production apparatus shown in FIG. 18 contains a radiation device 32, a power source 34, a chamber 36 and a controlling device 38, as similar to the production apparatus shown in FIG. 16. In FIG. 18, an ionizer 46 is provided prior to a step of conveying the liquid crystal panel 10 to the chamber 36. The ionizer 46 generates ions as shown by the arrow in the figure, and removes electrostatic charge 47 injected in the liquid crystal panel 10 with the ions. The liquid crystal panel 10 is thus destaticized with the ionizer 46 from above or beneath the liquid crystal panel 10 before polymerization, and then the panel is subjected to the polymerization treatment. Electrostatic charge injected on the liquid crystal panel 10 is removed before polymerization, whereby local fluctuations in effective voltage can be removed to suppress display unevenness after polymerization. Consequently, a liquid crystal display device without display unevenness can be obtained.

Figure 19:
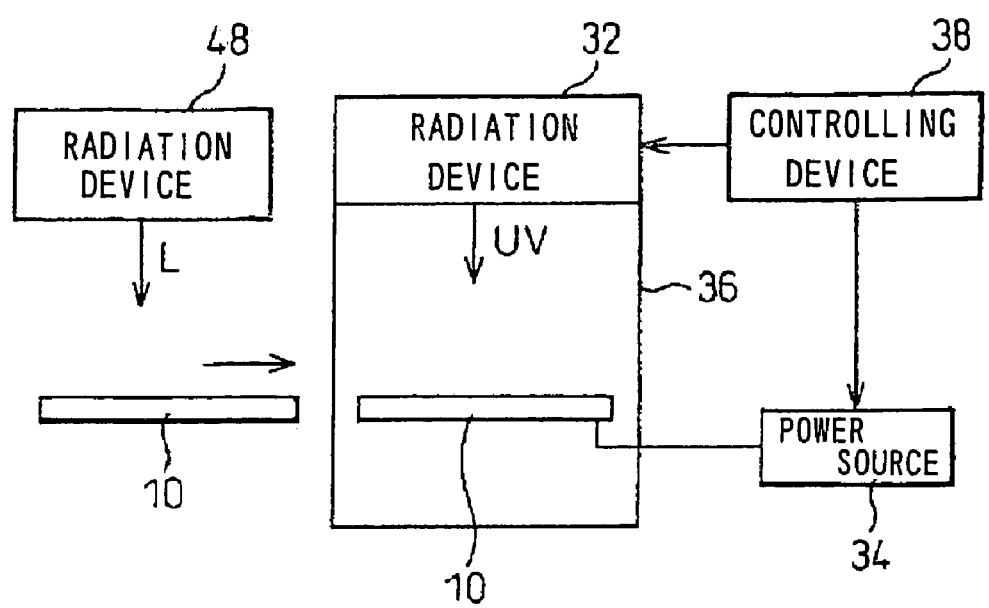
FIG. 19 is a diagram showing a further example of a production apparatus for the liquid crystal display device according to the second embodiment of the invention.

FIG. 19 is a diagram showing a further example of the production apparatus for a liquid crystal display device according to this embodiment. The production apparatus shown in FIG. 19 contains a radiation device 32, a power source 34, a chamber 36 and a controlling device 38, as similar to the production apparatus shown in FIG. 16. In FIG. 19, a radiation device 48 is provided prior to a step of conveying the liquid crystal panel 10 to the chamber 36. The radiation device 48 radiates the liquid crystal panel 10 with light having a longer wavelength than that on polymerization.

For example, the radiation device 32 used upon polymerization radiates light having a wavelength of 300 to 400 nm. On the other hand, the radiation device 48 used before polymerization radiates light having a wavelength of 400 to 440 nm. According to the procedures, a desired pretilted state can be obtained in a short period of time of UV radiation upon application of a voltage.

In the aforementioned constitution, the irradiation before polymerization may be effected with or without application of a voltage. The liquid crystal panel is irradiated with light having a longer wavelength than that on polymerization or with weak light, whereby display unevenness on a part locally irradiated with light having a longer wavelength is prevented from occurring. According to the procedure, furthermore, the polymerizable component in the liquid crystal composition is activated to shorten the radiation time required for polymerization. Moreover, the γ value, the black luminance and the white luminance of the display device can be maintained constant by irradiating with light having a longer wavelength at an arbitrary intensity for an arbitrary period of time.

Figure 23:
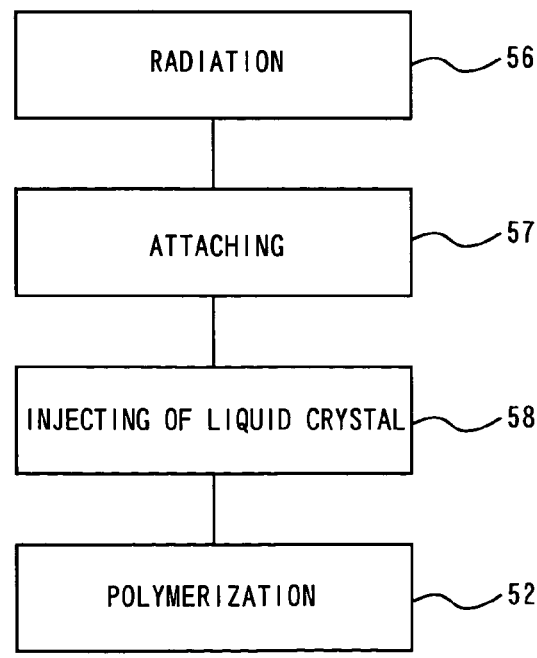
FIG. 23 is a flow chart showing a further example of a polymerization treatment.

FIG. 23 is a flow chart showing a further example of the polymerization treatment. In FIG. 23, the glass substrates 12 and 14 are irradiated with light in a step 56. In this case, for example, the glass substrates 12 and 14 are irradiated with light having a wavelength of 150 to 400 nm. The glass substrates 12 and 14 may be heated instead of the irradiation with light. In a step 57, the pair of glass substrates 12 and 14 are attached. In a step 58, the aforementioned liquid crystal 16 containing the polymerizable component is charged between the pair of glass substrates 12 and 14. In a step 52, the polymerizable component contained in the liquid crystal 16 is polymerized and heated under application of a voltage and radiation of an ultraviolet ray. The order of the step 56 and the step 57 may be inverted.

According to the constitution, the substrate or the blank cell before injecting the liquid crystal composition is subjected to irradiation of light or application of heat, whereby a foreign matter generating a radical or a cation under UV radiation or heat is reacted before injecting the liquid crystal composition to prevent the foreign matter from functioning as a polymerization initiator upon polymerization. Therefore, the polymerization can be stably carried out. Furthermore, in the case where the process step is applied to a substrate before coating an alignment film, the wettability on the surface of the substrate is improved to relieve failure of the alignment line due to repellency.

According to this embodiment as described in the foregoing, in a liquid crystal display device, in which a pretilt angle and a tilt direction upon application of a voltage of liquid crystal molecules are controlled by using a polymerizable component capable of being polymerized with light or heat (a polymer material), the display characteristics can be improved, and fluctuation in optical characteristics among the liquid crystal display devices can be suppressed.

The invention is not construed as being limited to the aforementioned embodiments, and various changes and modifications may be made therein.

For example, while such a liquid crystal device has been exemplified as a device that contains a color filter layer formed on a counter substrate disposed as facing a TFT substrate, the invention is not limited thereto and can be applied to a liquid crystal display device having a so-called CF-on-TFT structure, in which a color filter layer is formed on a TFT substrate.

As described in the foregoing, a liquid crystal display device providing good display characteristics can be realized.

What is claimed is:

1. A method for producing a liquid crystal display device comprising the steps of:

sealing a liquid crystal containing a polymerizable component capable of being polymerized with heat or light between a pair of substrates having been disposed as being opposed to each other;

polymerizing the polymerizable component by irradiating the liquid crystal with light of a prescribed luminance at a prescribed temperature for a prescribed irradiating time under application of a prescribed voltage, so as to control a pretilt angle and a tilt direction of liquid crystal molecules; and measuring a thickness of a cell or a height of a pillar spacer formed on one of the pair of substrates before and/or after injecting the liquid crystal, wherein at least one of the voltage, the temperature, the luminance and the irradiation time is controlled as a parameter to obtain prescribed optical characteristics, and the parameter is controlled, while polymerizing the polymerizable component, under feedback of a measured thickness of the cell or a measured height of the pillar spacer.

2. A method for producing a liquid crystal display device as claimed in claim 1, wherein the voltage is controlled within a range of 0.1 V to 100 V.

3. A method for producing a liquid crystal display device as claimed in claim 1, wherein the temperature is controlled within a range of −30° C. to 250° C.

4. A method for producing a liquid crystal display device as claimed in claim 1, wherein the luminance is controlled within a range of 1 mW/cm$^2$ to 10,000 mW/cm$^2$.

5. A method for producing a liquid crystal display device as claimed in claim 1, wherein the radiation time is controlled within a range of 1 msec to 24 hours.

6. A method for producing a liquid crystal display device as claimed in claim 1, wherein the parameter is controlled to compensate a luminance distribution within the panel.

7. A method for producing a liquid crystal display device as claimed in claim 1, wherein the optical characteristics include γ characteristics and a transmittance upon displaying black.

* * * * *